Jan. 30, 1951 R. ALLEN 2,539,941
FORMING AND CUTTING TOOL
Filed Aug. 21, 1946 2 Sheets-Sheet 1

INVENTOR.
Reginald Allen
BY

Patented Jan. 30, 1951

2,539,941

UNITED STATES PATENT OFFICE 2,539,941

FORMING AND CUTTING TOOL

Reginald Allen, Coventry, England

Application August 21, 1946, Serial No. 692,070
In Great Britain December 7, 1945

4 Claims. (Cl. 125—11)

This invention relates to apparatus for forming or cutting for example by means of a diamond tool a circular concavity or convexity of desired radius for example on a grinding wheel or the like and has for its object the provision of an apparatus of this nature capable of being set or adjusted to form concave or convex surfaces of different radii from zero upwards. The smallest concavity obtainable by known apparatus has a radius of approximately $\frac{3}{16}$ of an inch, whereas with the apparatus according to this invention much smaller radii are obtainable as the apparatus is capable of adjustment until the limiting position for a zero radius is obtained.

According to the present invention apparatus for forming or cutting a circular concavity or convexity of predetermined radius for example on a grinding wheel or the like comprises a carrier for holding a diamond point or other forming or cutting tool and having a sliding and pivotal connection with a base structure so that the distance of said pivot from the point of said diamond or other tool is greater than the predetermined radius but is progressively reduced as said carrier is moved about its pivot to either side of its central position. By suitable arrangement of said pivot to one side or the other of the diamond point or other tool the apparatus may be adapted for forming concavities or convexities respectively.

In the accompanying drawings representing apparatus constructed in accordance with the present invention—

Figure 1:
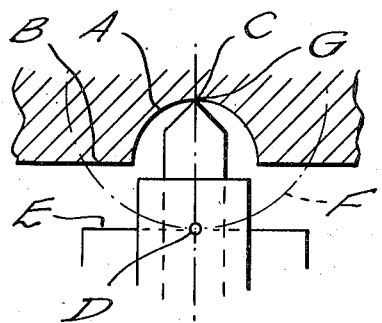
Fig. 1 is a diagrammatic representation of the effective parts of an apparatus for forming concavities with the tool in its central position and is used to explain the operation of said apparatus.
Figure 2:
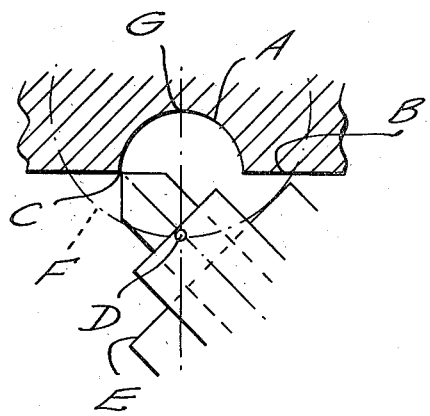
Fig. 2 is a similar view to Fig. 1 with the tool moved to one side from its central position.

Figs. 1 and 2 indicate diagrammatically how a circular concavity A may be cut or formed in a grinding wheel or workpiece B by means of a diamond point or like tool C movable angularly about a pivot D the distance of which from said diamond point is twice the predetermined radius of the desired concavity A when the said tool is in the central position shown in Fig. 1. In order that this may be effected it will be seen that said distance between the point C and the pivot D must be progressively decreased as the tool is moved about said pivot to either side of the central position shown in Fig. 1 until the limiting position shown in Fig. 2 is reached at the extremity of the concavity. In order to effect this progressive decrease in the distance between the pivot and the point of the tool the carrier for holding said tool is provided with a follower surface E which is constantly maintained in a definite angular relation to the tool for example as shown at right angles to the centre line of said tool while at the same time said follower surface is capable of sliding backwards and forwards with relation to said centre line. As the tool is moved about its pivot D to either side of its central position said follower surface is caused to slide backwards by engagement with a stationary form plate or template F also of circular form, that is, having an arcuate working surface. The said follower surface E thus remains tangential to said template and as the tool is moved angularly from its central position draws said tool backwards in a progressive manner so that the point of said tool describes the circular arc of the predetermined radius which is desired for the concavity.

By moving the centre G of said template nearer to the pivot D concavities of progressively smaller radii can be obtained, until the limiting position corresponding to a zero radius would be reached when the centre G coincides with the pivot D.

Figure 3:
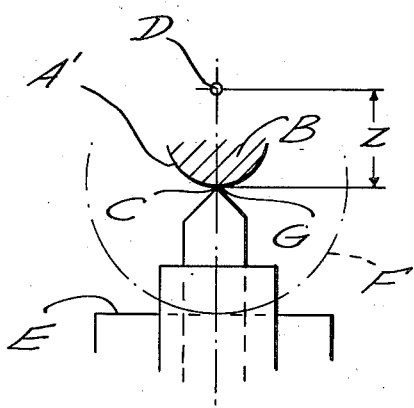
Figs. 3 and 4 are diagrammatic views similar to Figs. 1 and 2 respectively but of apparatus for forming convexities.
Figure 4:
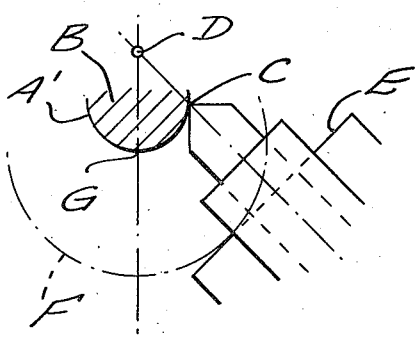

Figs. 3 and 4 are similar views to those shown in Figs. 1 and 2 but with the template F at the opposite side of the tool point C from the pivot D so that a convex surface $A^1$ of predetermined radius is formed on the grinding wheel said radius being variable as before by adjusting the distance between the pivot D and the centre G of the template. Thus if this distance is adjusted to 0.750 inch a convexity of 0.375 inch radius will be produced with a template of 1 inch radius.

Figure 5:
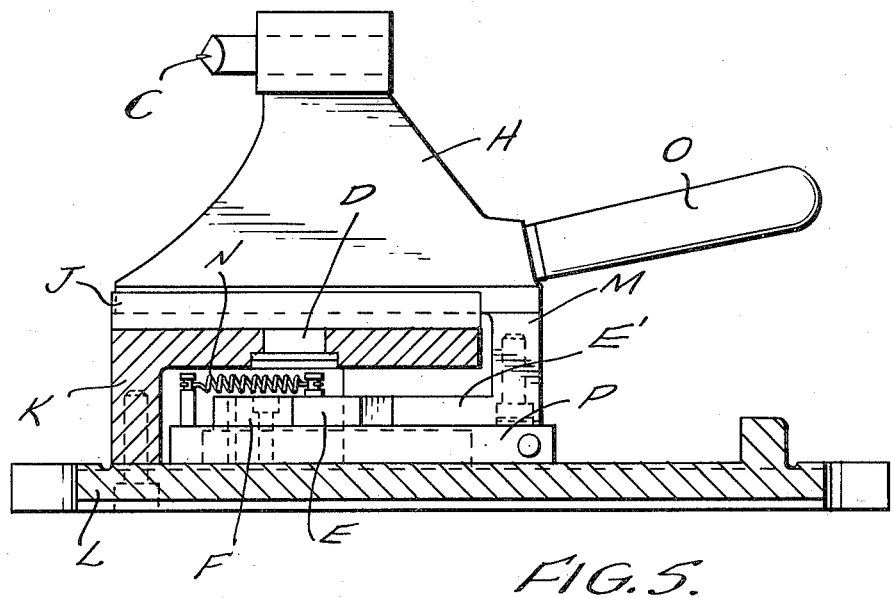
Fig. 5 is a part-sectional side elevation of a practical form of apparatus for forming concavities.
Figure 6:
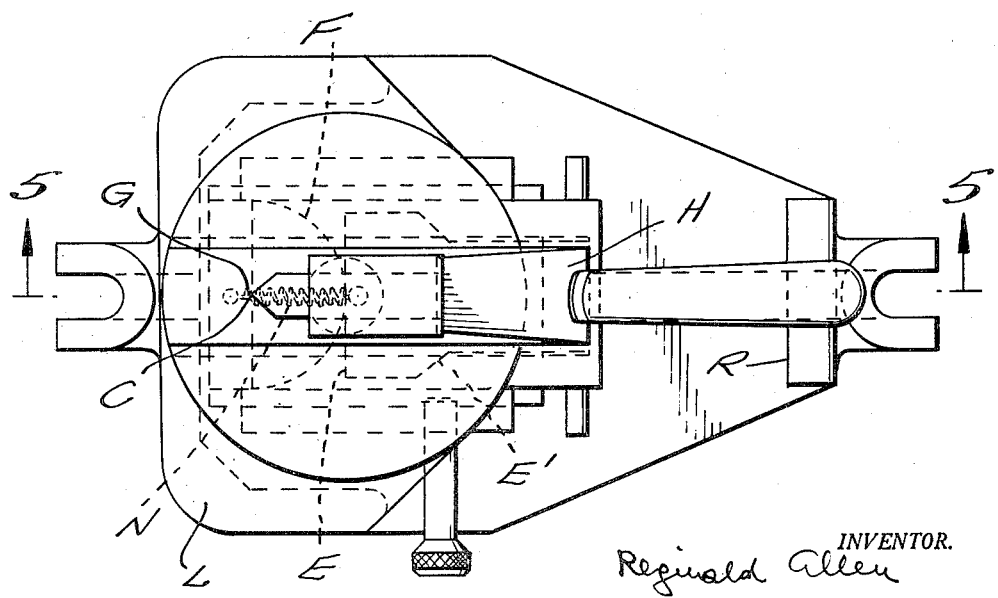
Fig. 6 is a plan of the apparatus shown in Fig. 5.

In the practical form of apparatus shown in Figs. 5 and 6 and adapted to form concavities as diagrammatically indicated in Figs. 1 and 2 the diamond tool C is mounted in a carrier H which is slidably mounted for straight line movement in a pivot plate J which in turn is pivotally mounted at D on a fixed bracket or support K upstanding from a base structure L. Said carrier has at its rear end a depending portion M which is attached to a follower $E^1$ formed at its front end with a flat follower or working surface E. The said follower is continually held by a spring N so as to bear tangentially against the periphery of the circular template F. Thus as the said carrier and tool are moved angularly from their central position for example by means of a handle O said follower together with the carrier and tool becomes moved backwards so that the tool point describes the predetermined radius.

In order to allow the distance between the centre G of the template and the pivot D to be varied along a line disposed at right angles to the axis of rotation of workpiece B, for varying the radius of the resulting concavity said template is carried by a sliding plate P which is adjustable along the base structure L toward or away from the wheel B and is secured in its adjusted position by means of a screw Q. A setting face R may be provided upstanding from said base L so that a measurement may be obtained of the distance of the slide P from said setting face.

For producing convexities of predetermined radius as explained above the apparatus could be modified so that the template F is at the opposite side of the tool point C from the pivot D.

What I claim is:

1. Apparatus for forming a semi-circular concave or convex cut upon a stationary or rotating work piece, including the combination of a fixed base; a stationary support mounted on the base; a pivot plate movably supported on the stationary support; a pivot mounting pivotally connecting the pivot plate with said stationary support and allowing said pivot plate to swivel on the latter; a tool carrier slidably mounted upon said pivot plate and conditioned for holding a forming tool in working position; a template stationarily supported upon said fixed base having an arcuate working surface and located with the center of the arc thereof spaced from the axis of said pivot mounting upon a line intersecting said center and axis and disposed substantially in line with the longitudinal axis of the tool carrier; guide means upon the pivot plate engaging said tool carrier for limiting movement of said tool carrier to longitudinal straight line movement upon said pivot plate; a follower secured to said tool carrier having a flat working surface disposed at right angles to the longitudinal axis of said tool carrier and extending on both sides thereof, said working surface slidably abutting the arcuate working surface of said template in tangential relation thereto; and means resiliently urging said follower into continuous contact with said template in all positions of said tool carrier on said pivot plate; the arrangement being such that when the forming tool is disposed in central position, the point thereof coincides with a vertical center line of the arcuate working surface of the template while the distance from the point of said forming tool to the central axis of the pivot mounting of said pivot plate is normally substantially twice the length of the predetermined radius of the cut to be formed in the work piece, the mentioned distance being progressively reduced during operation when the carrier is swivelled angularly about said pivot mounting to either side of said central position.

2. Apparatus for forming a semi-circular concave or convex cut upon a stationary or rotating work piece, including the combination of a fixed base; a stationary support mounted on the base; a pivot plate movably supported on the stationary support; a pivot mounting pivotally connecting the pivot plate with said stationary support and allowing said pivot plate to swivel on the latter; a slidable adjusting plate supported on said base; guide means on the latter engaging with the adjusting plate for limiting movement of said adjusting plate to a linear adjusting movement along the longitudinal axis of said base; securing means connecting said adjusting plate with said base for fixing said adjusting plate in any attained position of adjustment upon said base; a tool carrier slidably mounted upon said pivot plate and conditioned for holding a forming tool in working position; a template fixed on said adjusting plate having an arcuate working surface and located with the center of the arc thereof spaced an adjustable distance from the axis of said pivot mounting upon a line intersecting said center and axis and disposed substantially in line with the longitudinal axis of said adjusting plate; guide means upon said pivot plate engaging said tool carrier for limiting movement of said tool carrier to longitudinal straight line movement upon said pivot plate; means mounted on the tool carrier for swivelling said tool carrier about the pivot mounting upon said pivot plate; a follower secured to said tool carrier having a flat working surface disposed at right angles to the longitudinal axis of said tool carrier and extending on both sides thereof, said flat working surface slidably abutting the arcuate working surface of said template in tangential relation thereto; and means resiliently urging said follower into continuous contact with said template in all positions of said tool carrier on said pivot plate; the arrangement being such that when the slide means on the pivot plate is parallel to the slide means of the base, the forming tool is disposed in central position with the point thereof coinciding with a vertical center line of the arcuate working surface of the template while the distance to the central axis of the pivot mounting of said pivot plate is normally substantially twice the length of the predetermined radius of the cut to be formed in the work piece, the mentioned distance being progressively reduced during operation when the carrier is swivelled angularly about said pivot mounting to either side of said central position.

3. Apparatus for forming a semi-circular concave or convex cut upon a stationary or rotating work piece, including the combination of a fixed base having one end extending forwardly in a predetermined working direction and the opposite end extending rearwardly away from said working direction; a stationary support having one portion thereof fixed upon the base and another portion extending rigidly over the latter and spaced a distance above said base with a portion in substantial parallelism therewith; a pivot plate movably supported on the other portion of said stationary support; a pivot mounting pivotally connecting the pivot plate with the latter support and allowing said pivot plate to swivel thereon; a slidable adjusting plate supported on said base; guide means on the latter engaging the adjusting plate for limiting movement of said adjusting plate to a linear adjusting movement along the longitudinal axis of said base, securing means connecting said adjusting plate with said base for fixing said adjusting plate in any attained position of adjustment upon said base; a template fixed on said adjusting plate beneath said other portion of said stationary support out of contact therewith having an arcuate working surface and located with the center of the arc thereof spaced an adjustable distance from the axis of said pivot mounting upon a line intersecting said center and axis and disposed substantially in line with the longitudinal axis of said adjusting plate; a tool carrier slidably mounted upon said pivot plate and conditioned for holding a forming tool in working position; guide means upon said pivot plate engaging said tool carrier for limiting movement of said tool carrier to longitudinal straight line movement upon said pivot plate; manual means upon the tool carrier for swivelling said tool carrier about the pivot mounting upon said pivot plate; a follower secured to said tool carrier having a flat working surface disposed at right angles to the longitudinal axis of said tool carrier and extending on both sides thereof, said flat working surface slidably abutting the arcuate working surface of said template in tangential relation thereto; and means resiliently urging said follower into continuous contact with said template in all positions of said tool carrier on said pivot plate; the arrangement being such that when the slide means on the pivot plate is parallel to the slide means of the base, the forming tool is disposed in central position with the point thereof coinciding with a vertical center line of the arcuate working surface of the template while the distance to the central axis of the pivot mounting of said pivot plate is normally substantially twice the length of the predetermined radius of the cut to be formed in the work piece, the mentioned distance being progressively reduced during operation when the carrier is swivelled angularly about said pivot mounting to either side of said central position.

4. Apparatus for forming a semi-circular concave or convex cut upon a stationary or rotating work piece, including the combination of a fixed base having one end extending forwardly in a predetermined working direction and the opposite end extending rearwardly away from said working direction; a stationary support having a forward portion fixed upon the base and a rearward portion directed rearwardly over said base and spaced a distance above the latter with a portion in substantial parallelism and out of contact therewith; a pivot plate movably supported on the rearward portion of said stationary support; a pivot mounting pivotally connecting the pivot plate with the stationary support and allowing said pivot plate to swivel thereon; a slidable adjusting plate supported on said base and extending forwardly beneath said rearward portion of said stationary support; guide means on said base engaging said adjusting plate for limiting movement of the adjusting plate to linear forward and rearward movement thereon along the longitudinal axis of said base; a releasable adjusting screw accessible upon the securing means connecting said adjusting plate with said base for fixing said adjusting plate in any attained position of adjustment upon said base; a template fixed on said adjusting plate beneath said rearward portion of said stationary support having an arcuate working surface and located with the center of the arc thereof spaced an adjustable distance from the axis of said pivot mounting upon a line intersecting said center and axis and disposed substantially in line with the longitudinal axis of said adjusting plate; a tool carrier slidably mounted upon said pivot plate and conditioned for holding a forming tool in working position; guide means upon said pivot plate in contact with said tool carrier for limiting movement of said tool carrier to longitudinal straight line movement upon said pivot plate; an operating member extending rigidly from the tool carrier for swivelling the latter at will about the pivot mounting of the pivot plate; a rear member rigid upon said tool carrier extending rearwardly of the rearward portion of said stationary support; a follower secured on said rear member and extending rigidly thereon toward the arcuate working surface of said template, said follower terminating in a substantially flat working surface disposed at right angles to the longitudinal axis of said tool carrier and extending on either side thereof, said flat working surface slidably abutting said arcuate working surface of said template in tangential relation thereto; and a spring biasing said follower into continuous contact with said template in all positions of said tool carrier on said pivot plate; the arrangement being such that when the slide means on the pivot plate is parallel to the slide means of the base, the forming tool is disposed in central position with the point thereof coinciding with a vertical center line of the arcuate working surface of the template while the distance to the central axis of the pivot mounting of said pivot plate is normally substantially twice the length of the predetermined radius of the cut to be formed in the work piece, the mentioned distance being progressively reduced during operation when the carrier is swivelled angularly about said pivot mounting to either side of said central position.

REGINALD ALLEN.

REFERENCES CITED

The following references are of record in the file of this patent:

UNITED STATES PATENTS

| Number | Name | Date |
|---|---|---|
| 1,384,726 | Duplessie | July 12, 1921 |
| 2,312,347 | Madsen | Mar. 2, 1943 |
| 2,372,597 | Miller | Mar. 27, 1945 |
| 2,372,732 | Norris | Apr. 3, 1945 |
| 2,415,010 | Hill | Jan. 28, 1947 |
| 2,434,615 | Hopkins | Jan. 13, 1948 |
| 2,437,596 | Garnett | Mar. 9, 1948 |